United States Patent [19]
Dürholz et al.

[11] 3,907,841
[45] Sept. 23, 1975

[54] PROCESS FOR PREPARING 5-NITRO-NAPHTHOQUINONE-(1,4)

[75] Inventors: Friedrich Dürholz, Remscheid; Rolf Pütter, Dusseldorf; Axel Vogel, Cologne, all of Germany

[73] Assignee: Bayer Aktiengesellschaft, Leverkusen, Germany

[22] Filed: Apr. 18, 1974

[21] Appl. No.: 462,162

[30] Foreign Application Priority Data
Apr. 26, 1973 Germany............................ 2321003

[52] U.S. Cl.......... 260/396 R; 260/369; 260/396 N; 260/575
[51] Int. Cl.$^2$.................... C07C 45/16; C07C 49/66
[58] Field of Search........................ 260/396 R, 575

[56] References Cited
UNITED STATES PATENTS
2,355,593   8/1944   Kosolapoff..................... 260/396 R FOREIGN PATENTS OR APPLICATIONS
1,247,288   8/1967   Germany......................... 260/396 R Primary Examiner—Vivian Garner
Attorney, Agent, or Firm—Burgess, Dinklage & Sprung

[57] ABSTRACT

5-nitro-naphthoquinone-(1,4) is prepared by reducing 8-nitro-naphthoquinone-(1,4)-oxime-(1) and/or 5-nitro-naphthoquinone-(1,4)-oxime-(1) in an aqueous acid medium at a temperature of from −10° to 110°C, by at least the equivalent quantity of sulfur dioxide and/or phosphorus in the presence of hydrogen iodide or compounds that form hydrogen iodide, and oxidizing the resulting 8- and/or 5-nitro-4-aminonaphthol-(1) or the corresponding salt to 5-nitro-naphthoquinone-(1,4) at a temperature of from −10° to 100°C, optionally without first isolating the reduction product.

11 Claims, No Drawings

PROCESS FOR PREPARING 5-NITRO-NAPHTHOQUINONE-(1,4)

BACKGROUND

This invention relates to a particularly advantageous process for the preparation of 5-nitro-naphthoquinone-(1,4), from 8-nitro-naphthoquinone-(1,4)-oxime-(1) and/or 5-nitro-naphthoquinone-(1,4)=oxime=(1).

The selective reduction of 8-nitro-naphthoquinone-(1,4)-oxime-(1) to 5-nitro-4-aminonaphthol-(1) is already known (Zh. Vses. Khim. Obshen. 5 (1969) pages 474 to 475). The selective reducing agent used is phenyl hydrazine. This can only be obtained by a multi-stage process and moreover it is toxic. In addition, the reaction with phenyl hydrazine gives rise to byproducts which necessitate extensive purification. The known process is therefore not suitable for production on a technical scale.

SUMMARY

It has now been found that 5-nitro-naphthoquinone-(1,4) can be obtained in a particularly advantageous manner by reducing 8-nitro-naphthoquinone (1,4)-oxime-(1) and/or 5-nitro-naphthoquinone-(1,4)-oxime-(1) in an aqueous acid medium at a temperature of from −10° to 110°C by at least the equivalent quantity of sulphur dioxide and/or phosphorus in the presence of hydrogen iodide or compounds which form hydrogen iodide and then oxidising the resulting 8- and/or 5-nitro-4-aminonaphtol-(1) or the corresponding salt thereof at a temperature of from −10° to 100°C to form 5-nitro-naphthoquinone-(1,4), if so desired, without first isolating the reduction product.

DESCRIPTION

Reduction with sulphur dioxide and/or phosphorus is preferably carried out at a temperature of 20° to 70°C and oxidation is preferably carried out at 20° to 60°C.

The following example serves to explain the process according to the invention:

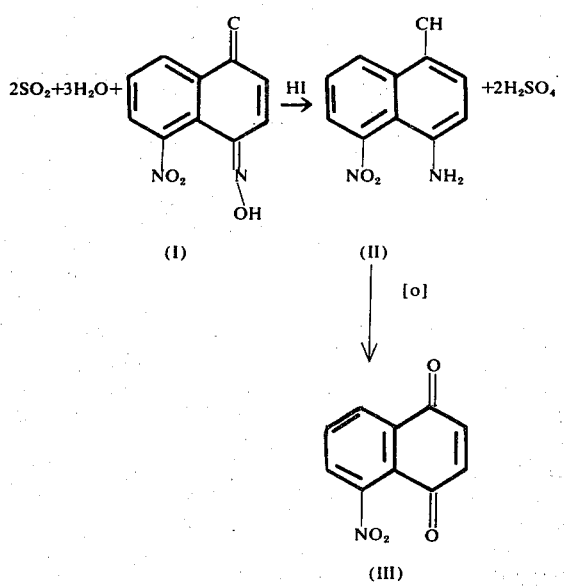

Preparation of compound (II) requires 4 reducing equivalents which in the process according to the invention may be supplied by 2 mols of sulphur dioxide and/or 4/5 g-atoms phosphorus in the presence of hydrogen iodide or of compounds which form hydrogeniodide. These reducing agents may also be used in excess without impairing the selectivity of reduction.

Sulphur dioxide may be used either at normal pressure or at a reduced or elevated pressure. Normal pressure is generally preferred.

The process according to the invention may be carried out either in an aqueous reaction medium or in a water containing organic reaction medium. The reaction mixture must contain at least the stoichiometrically required quantity of water. Generally, however, the process is carried out in an aqueous or organic reaction medium which contains water in excess of the stoichiometrically required quantity.

The aqueous or water-containing reaction medium should generally be acidic during the reaction although it is not always necessary to add acid to the reaction although it is not always necessary to add acid to the reaction medium initially, for example the amount of sulphuric acid and/or phosphoric acid produced by the reduction of iodine with sulphur dioxide and/or phosphorus may be sufficient; moreover, sulphuric acid and/or phosphoric acid are also formed as reaction products so that the quantity of acid in the reaction medium increases as the reaction progresses.

In general, however, it is advisable to add acid to the reaction medium intially. This may be particularly advantageous for obtaining a higher reaction velocity and hence a shorter reaction time.

The upper limit of acid concentration in the reaction medium is determined by the minimum water content of the reaction medium and also by the fact that the reducing agents used, e.g. sulphur dioxide, must have a sufficient reduction potential and must not, for example like sulphur dioxide in concentrated sulphuric acid and/or phosphoric acid, at as an oxidising agent towards the hydriodic acid which is used as the catalyst. It goes without saying that the acid used must not act as oxidising agent towards the hydriodic acid which is used as a catalyst.

Therefore, it is obvious that optimum acid concentration varies with each individual case and depends on the nature of the reaction medium and/or reducing agent. It can easily be calculated in each case from the known physical-chemical data or determined by one or a few preliminary tests.

The aqueous reaction media used are preferably aqueous mineral acids, for example sulphuric acid, in particular at a concentration of from 35 to 60% by weight, hydrochloric acid, in particular at a concentration of from 20 to 40% by weight, hydrobromic acid, in particular at a concentration of from 20 to 40% by weight and phosphoric acid, in particular at a concentration of from 40 to 90% by weight.

Instead of the above mentioned inorganic acids, however, strong organic acids may be used such as alkyl or aryl sulphonic acids (e.g. methane sulphonic acid, ethane sulphonic acid, trifluoromethane sulphonic acid, perfluorobutance sulphonic acid, perfluorooctane sulphonic acid, benzene sulphonic acid and p-toluene sulphonic acid) or trifluoroacetic acid.

The aqueous organic reaction media used may advantageously be a solution and/or a mixture of an organic solvent and water and optionally an aqueous acid.

The organic solvents used are preferably aliphatic carboxylic acids such as formic acid, acetic acid and propionic acid. Nitriles such as acetonitrile and propionitrile, ketones such as acetone and methyl ethyl ketone, alcohols such as methanol, ethanol, isopropanol, butanols, ethylene glycol or propylene glycol, ethers such as diethyl ether, tetrahydrofuran and dioxane, ethylene glycol monoalkyl ethers, and ethylene glycol dialkyl ethers (alkyl $C_1$–$C_4$), carboxylic acid esters such as ethyl acetate or butyl acetate, lactones such as γ-butyrolactone and sulphones such as sulpholan may also be used. Lastly, carboxylic acid amides such as dimethylformamide, N-methyl pyrrolidone and pyrrolidone may be used.

The process may also be performed in the presence of solvents which are not miscible or are miscible only to a limited extent with water, for example aromatic hydrocarbons such as benzene, toluene and their derivatives such as chlorobenzene, o-dichloro-benzene and nitrobenzene or aliphatic chloro compounds such as methylene chloride, carbon tetrachloride, ethylene dichloride and 1,2-dichoropropane. Mixtures of two or more of the above mentioned solvents may also be used.

The above mentioned solvents may be used as the reaction medium and the solubilising agent.

When used as the reaction medium, they are generally used in a quantity of from 300 to 5000 ml of solvent, preferably from 600–2000 ml of solvent, per mol of oxime.

When the solvents are used as a solubilising agent, e.g. for carrying out the process according to the invention, in an aqueous acid reaction media such as aqueous sulphuric acid, the solvents are generally used in a quantity of from 2 to 300 ml, preferably from 15 to 80 ml per mol of oxime.

The reaction velocity of the reduction with sulphur dioxide and/or phosphorus depends upon the hydrogen iodide concentration. As a general rule, 0.01 mol of hydriodic acid or of compounds which form hydriodic acid, preferably from 0.02 to 0.5 mol are used per mol of starting compound although larger quantities of hydriodic acid may also be used, e.g. 1 or 2 mol per mol of oxime because after termination of the reaction and removal of the reaction product, it can be recovered together with the solvent and used for the next batch.

According to a particular embodiment of the process of the invention, salts of divalent or trivalent iron may be additionally used as catalysts. A higher reaction velocity is obtained in this way than when using the given quantity of hydriodic acid alone.

The addition of an iron salt as the catalyst is advantageously carried out particularly when hydrochloric acid or hydrobromic acid is employed. The quantity of iron salts used is generally from 0.05 to 3 mol per mol of oxime, preferably from 0.5 to 1 mol. The salts of divalent and trivalent iron may be used e.g. $FeSO_4 \cdot 7H_2O$, $FePO_4 \cdot 2H_2O$, $FeBr_2 \cdot 4H_2O$, $FeBr_2$, $FeCl_2$, $FeCl_3 \cdot 6H_2O$ and $Fe_2(SO_4)_3$.

Apart from hydrogen iodide, there may also be used compounds which form hydrogen iodide under the reaction conditions, such as elementary iodine and/or salts of hydriodic acid. The following are examples: alkali metal and alkaline earth metal iodides such as sodium iodide, potassium iodide, or calcium iodide; ammonium salts such as ammonium iodide, tetraalkyl ammonium iodides (alkyl $C_{1-8}$) and alkyl-aralkyl ammonium iodides (alkyl $C_{1-8}$); aralkyl e.g. benzyl).

The temperature range given above is also employed when phosphorus is used as the reducing agent. Phosphorus is used in a quantity of at least 4/5 g-atoms but preferably in an excess of up to about 2 g-atoms, based on 1 mol of 8-and/or 5-nitro-naphthoquinone oxime.

8- and 5-nitro-naphthoquinone oximes are already known (Friedländer, Volume 4, pages 342 to 344; C. Grabe, A. Oser, Ann. 335 (1904), pages 143 et seq.; Zh. Vses. Khim. Obshch. 5 (1969), pages 474–475).

In the context of the invention 8- and 5-nitronaphthoquinone oximes include, for example, 8-nitronaphthoquinone-(1,4)-oxime-(1) and 5-nitronaphthoquinone-(1,4)-oxime-(1) and their tautomeric forms 5-nitro-4-nitroso-naphthol-(1) and 8-nitro-4-nitroso-naphthol-(1) or a mixture of the tautomers.

The process according to the invention is generally carried out as follows:

5- and/or 8-nitro-naphthoquinone oxime is introduced into the reaction medium which is in the reaction vessel. The reducing agent and hydriodic acid and/or compounds which form hydriodic acid are then added; alternatively, the reducing agent and hydriodic acid and/or compounds which form hydriodic acid may be placed into the reaction vessel together with the reaction medium and 5- and/or 8-nitro-naphthoquinone oxime may then be introduced. It is also possible for 5- and/or 8-nitro-naphthoquinone oxime and hydriodic acid and/or compounds which form hydriodic acid to be introduced into the reaction vessel together with the reaction medium, and the reducing agent may then be continuously added in the course of the reduction process. Whichever method is employed, additional reducing agent may, of course, be added during the reduction process to replace that which has been used up, and it is not necessary to add all the reducing agent in one quantity at the beginning of the reaction.

5- and/or 8-nitro-4-aminonaphthol formed by reduction, or the corresponding salt, may be isolated after the reaction and oxidised to 5-nitro-naphthoquinone-(1,4) in a second, separate reaction step.

If, on the other hand, reduction is carried out in a solvent which is inert towards the oxidising agent used, isolation of the reduced product may advantageously omitted and oxidation may be carried out in the same reaction medium, if necessary after dilution with water. Excess reducing agent, in particular sulphur dioxide, is generally removed before the addition of the oxidising agent. Sulphur dioxide may advantageously be removed by blowing it out with an inert gas such as nitrogen.

According to one particularly preferred embodiment, a finely divided suspension of 8- and/or 5-nitronaphthoquinone oxime is obtained by dissolving the oxime in sulphuric acid monohydrate and then running this solution into water to adjust it to the required sulphuric acid concentration. This method is particularly advantageous because, after reduction with $SO_2$, the aminonaphthol obtained can be easily oxidised in the same reaction medium without first isolating it.

The method described above may advantageously be modified by pouring the solution of crude 8- and/or 5- nitro-naphthoquinone oxime obtained by treating 1,8- and/or 1,5-dinitronaphthalene with oleum in known manner into the necessary quantity of water in order to adjust it to the required sulphuric acid concentration, thereby obtaining the above mentioned finely divided suspension directly without isolationg of the 8- and/or 5-nitro-naphthoquinone oxime.

When the aminonaphthol formed by reduction in the first stage of the process is oxidised in the second stage of the process according to the invention, the reaction medium employed may generally have the same acid concentration as in the reduction stage. It is advantageous, however, especially when employing high acid concentrations at the reduction stage to reduce the acid concentration for the oxidation stage by adding water. Oxidation of the aminonaphthol or its corresponding salt may, of course, also be carried out in a weakly acidic, neutral or weakly basic medium. In this case, the intermediate isolation of the reduction product may be advantageous. Oxidation is, however, preferably carried out in an acidic medium.

The known oxidising agents may generally be employed for oxidation, especially those which are already known for the oxidation of hydroquinones or of the aminophenols or aminonaphthols which are structurally related to hydroquinones (Beilstein VII, pages 709, 724 et. seq., 733; supplement I, 384 et.seq. supplement II, 645, 651; Beilstein VII, 599, 609; supplement I, 337, 340; supplement II, 566).

The following are suitable oxidising agents: iron (III) halides, copper (II) halides, potassium permanganate and manganese dioxide.

Chromic acid and its salts such as chromates and bichromates, particularly of the alkali metals, salts of oxyacids of chlorine, such as sodium chlorate with the addition of compounds of vanadium such as $VCl_3$, $V_2O_5$ and ammonium vanadate and/or iron salts such as $FeSO_4.7 H_2O$, $FeCl_2.4H_2O$ and $FeCl_3.6H_2O$ and/or copper halides such as $CuCl_2$.

Hydrogen peroxide and peroxo compounds such as peroxo-bisulphate, particularly in the presence of iron and copper halides.

Oxidising systems such as nitric acid, nitrous acid and their salts, $NO_2$, $N_2O_3$, nitrous gases, in particular in a hydrochloric acid reaction medium and in the presence of iron salts or copper salts.

If desired, air or other oxygen-containing gases as well as oxygen itself may be used to regenerate other oxidising agents which may then be used in less than equivalent quantities or only in catalytic quantities.

Compared with known processes, the process according to the invention yields 5-nitro-naphthoquinone in a particularly simple manner, higher yields and with a higher degree of purity. This must be regarded as distinctly surprising since it is well known that nitro groups are reduced to amino groups by hydrogen iodide. It is therefore very surprising that by the process according to the invention reduction may be performed selectively in the case of 5-and/or 8-nitro-naphthoquinone oxime.

5-nitro-naphthoquinone can be converted into 1-nitro-anthraquinone in a known manner by butadiene addition and dehydrogenation of the addition product. The reaction product so obtained can be reduced to 1-aminoanthraquinone an important starting material for dyes. A uniform 1-nitro-anthraquinone can be prepared in this way whereas nitration of anthraquinone to 1-nitro-anthraquinone results in a mixture of various nitro derivatives which are difficult to separate.

The percentages given in the following examples are percentages by weight unless otherwise indicated. Where the concentrations of mineral acids are given, the remainder is water.

EXAMPLE 1

A fine suspension of 21.8 g of 8-nitro-naphthoquinone oxime in 100 ml of 30% hydrochloric acid is saturated with sulphur dioxide gas at 30°C. The reaction commences after the addition of 7 ml of hydriodic acid (57%). The reaction mixture is maintained at 30°C for 2 hours while sulphur dioxide is continuously passed through, and it is then cooled to room temperature. When cold, the pale yellow residue of 5-nitro-4-aminonaphthol-(1) hydrochloride is suction-filtered and washed with a small quantity of concentrated hydrochloric acid. Slightly acidified water is poured over the filter residue at about 50°C until the filtrate is colourless. The filtrate is oxidised with 12 g of $Na_2Cr_2O_7.2H_2O$ at 40°C and the resulting precipitate is suction-filtered, washed with water and dried. 18.9 g (93% of theoretical) of 5-nitro-naphthoquinone are obtained. Melting point 163°C.

EXAMPLE 2

21.8 g of 8-nitro-naphthoquinone oxime are suspended in 100 ml of 30% hydrochloric acid and saturated with sulphur dioxide at 30°C. 12 g of iron-II-chloride tetrahydrate and 1 ml of hydriodic acid are added at 30°C and sulphur dioxide is then passed through once again. After 2 hours, a sample of the reaction mixture dissolves to a clear solution in water. The reaction mixture is then cooled to room temperature and worked up as described in Example 1. 19.1 g (94% of the theoretical) of 5-nitro-naphthoquinone are obtained. Melting point 163°C.

EXAMPLE 3

An impure oxime prepared by the molecular rearrangement of 1,8-dinitro-naphthalene by the method according to Friedländer, Volume 4, page 342, is reacted as described in Example 1. Pure 5-nitro-naphthoquinone with a melting point of 162°C is again obtained in a yield of 92% of theoretical, based on the 8-nitro-naphthoquinone oxime content of the starting material.

EXAMPLE 4

21.8 g of 8-nitro-naphthoquinone oxime and 6 g of red phosphorus are suspended in 240 ml of hydrochloric acid (38%). The suspension is cooled with ice, and 15 ml of 57% hydriodic acid are added. After about half an hour, no more starting material can be detected by thin layer chromatography. The reaction product is suction-filtered and separated from excess phosphorus by extracting the amine salt from the filter cake with weak aqueous hydrochloric acid heated to about 50°C. The filtrate is oxidised with 60 g of iron-III-chloride hexahydrate at 50°C. 17 g (84% of the theory) of 5-nitro-naphthoquinone (melting point 159°C) can be isolated.

EXAMPLE 5

A solution of 21.8 g of 8-nitro-naphthoquinone oxime in 150 g of sulphuric acid monohydrate is poured into 208 ml of water with stirring. After cooling to 60°C, the resulting suspension is saturated with sulphur dioxide, and 10 ml of aqueous 57% hydriodic acid are added. Introduction of $SO_2$ is continued during the reaction, which takes place within a temperature range of 55°C to 60°C. After 20 minutes, a sample of the reaction mixture forms a clear, yellow solution in warm water. The contents of the flask are introduced into 500 ml of water. Excess sulphur dioxide is removed by blowing nitrogen through and the reaction mixture is oxidised with 12 g of $Na_2Cr_2O_7 \cdot 2H_2O$ at 50°C, suction-filtered and washed first with water, then with 5% potassium iodide aqueous solution and again with water. After drying, 19.5 g (96.5% of the theoretical) of 5-nitro-naphthoquinone, melting point 162°C, are obtained.

EXAMPLE 6

26 g of impure approximately 84% 8-nitro-naphthoquinone oxime prepared by the molecular rearrangement of 1,8-dinitro-naphthalene are suspended in 200 ml of aqueous sulphuric acid (42% by weight). The suspension is heated to 40°C and sulphur dioxide is introduced to the point of saturation. 2 g of sodium iodide are then added, after which introduction of sulphur dioxide continues. After completion of the reaction, excess sulphur dioxide is driven out with a nitrogen stream and the reaction mixture is diluted with 150 ml of water and oxidised by the addition of a solution of 12 g of $Na_2Cr_2O_7 \cdot 2H_2O$ in 20 ml of water at 40°C. The reaction product is then suction-filtered and washed with water, sodium iodide solution and again with water. The moist filter cake is stirred up with 300 ml of toluene, water is removed azeotropically in a water separator, and the insoluble constituents are filtered off at the boiling point after the addition of 1 g of active charcoal. After concentrating by evaporation to about 40 ml and cooling, 18.2 g (90% of the theoretical based on the oxime content) of 5-nitro-naphthoquinone, melting point 164°C, are obtained.

EXAMPLES 7 to 9

A solution of 21.8 g of 8-nitro-naphthoquinone oxime in 150 g of sulphuric acid monohydrate is poured into water with stirring, the quantity of water being calculated to result in a sulphuric acid with the concentration indicated below. The suspension is saturated with sulphur dioxide at the reaction temperature indicated below and 10 ml of hydriodic acid are added. The reaction is considered complete when a sample of the reaction mixture dissolves in warm water (about 60°C) to form a clear solution. Excess sulphur dioxide is removed by passing a nitrogen stream into the reaction mixture. 150 ml of water are added to the resulting suspension of amine salt, and the reaction mixture is oxidised by the addition of an aqueous sodium dichromate solution (15 g of sodium dichromate in 20 ml of water). After suction-filtration and washing with water, potassium iodide solution and again with water, the reaction product is dried at 50°C.

| Example | $H_2SO_4$-conc. (%) | Temp. (°C) | Time (h) | 5-$NO_2$-naphtho-quinone (g) | Melting point (°C) |
|---|---|---|---|---|---|
| 7 | 50 | 35 | 3–3.5 | 19.2 | 161 |
| 8 | 45 | 45 | 2.5–3 | 19 | 162 |
| 9 | 35 | 40 | approx. 10 | 15 | 159 |

EXAMPLE 10

A mixture of 10.9 g of 8-nitro-naphthoquinone oxime and 10.9 g of 5-nitro-naphthoquinone oxime is reacted as described in Example 7. 19.7 g (97% of theoretical) of 5-nitro-naphthoquinone (melting point 162°C) are isolated.

EXAMPLE 11

A suspension of 21.8 g of 8-nitro-naphthoquinone oxime in 200 ml of 98% glacial acetic acid is saturated with sulphur dioxide at 40°C to 45°C, and 5 ml of 57% hydriodic acid (57%) are added. After 3 hours, excess sulphur dioxide is removed by blowing nitrogen through the reaction mixture which is then poured into 500 ml of water and oxidised with 60 g of iron-III-chloride hexahydrate at 50°C. 18.7 g (92% of the theoretical) of 5-nitro-naphthoquinone (melting pont 162°C) are obtained.

EXAMPLE 12

The reaction is carried out according to Example 11 and after completion of reduction, gaseous hydrogen chloride is introduced to bring about sustantial precipitation of the salt of 5-nitro-4-aminonaphthol-(1). The precipitate is suction-filtered and the filter residue is oxidised with 4.5 g of sodium chlorate in an aqueous hydrochloric acid medium by means of the addition of 0.5 g of ammonium vanadate a temperature of 25° to 30°C. 5-nitro-naphthoquinone-(1,4) thereby formed is filtered off and washed with water until neutral. The yield is 18.3 g (90% of the theoretical), melting point 160°C. The acetic acid together with hydriodic acid or iodine is distilled off from the mixture of acetic acid and mother liquor. The distillate can be used again for subsequent reactions after adjustment of its water content.

EXAMPLES 13 to 17

10.9 g of 8-nitro-naphthoquinone oxime are suspended in a solution of 80 ml of solvent and 20 of 37% hydrochloric acid. When the reaction mixture has been heated to about 45°C, sulphur dioxide is introduced until the reaction mixture is saturated with it and 2 ml of hydriodic acid (57%) are added. The reaction is left to continue until the starting material can no longer be detected by thin layer chromatographic analysis. Gaseous hydrochloric acid is introduced to isolate the amine salt and the reaction product is filtered off and washed with solvent. A pale yellow coloured nitroaminonaphthol salt is obtained which after suspension in 200 ml of water of the aqueous acid indicated in Table 2, is oxidised for about 1 hour at 40°C, using the oxidising agent indicated in Table 2.

Table 2

| Example | Solvent | Reaction time (h) (reduction) | aqueous acid (% by weight) | Oxidising agent | 5-nitro-naphtho-quinone (g) | Melting point (°C) |
|---|---|---|---|---|---|---|
| 13 | Aceto-nitrile | 1–1.5 | $H_2SO_4$ (5) | $Na_2Cr_2O_7 \cdot 2H_2O$ (7g) | 9.4 | 163 |
| 14 | i-pro-panol | 2–2.5 | $H_2SO_4$ (20) | $Na_2Cr_2O_7 \cdot 2H_2O$ (7g) | 9.2 | 162 |
| 15 | Tetra-hydro-furan | 0.5–1 | HCl (2) | $NaClO_3$ (2.5 g) | 9.0 | 160 |
| 16 | Acetic acid | 2–2.5 | HCl (2) | $FeCl_3 \cdot 6H_2O$ (30 g) | 9.3 | 162 |
| 17 | Acetone | 0.5–1 | — | $FeCl_3 \cdot 6H_2O$ (30 g) | 9.7 | 163 |

EXAMPLE 18

A suspension of 10.9 g of 8-nitro-naphthoquinone oxime in a mixture of 100 ml of dioxane and 10 ml of water is heated to 80°C. 40 ml of gaseous hydrogen chloride are introduced, 1 ml of hydriodic acid having a concentration of 57% per weight is added and sulphur consumed. The temperature is left to rise to 90°C. Reaction of the oxime is completed after about 10 minutes. The reaction mixture is poured into 500 ml of water, and at 40°C sufficient iron-III-chloride hexahydrate is added so that at the end of the reaction iodine starch indicator paper indicates the presence of an excess of oxidising agent (40 to 80 g of $FeCl_3 \cdot 6H_2O$). 9.55 g (94% of the theory) of 5-nitro-naphthoquinone (melting pont 162°C) are isolated.

EXAMPLE 19

10.9 g of 8-nitro-naphthoquinone oxime are suspended in a solution of 80 ml of methyl ethyl ketone and 20 ml of 37% hydrochloric acid. After heating the reaction mixture to about 45°C, 10 g of sulphur dioxide are introduced and 2 ml of 57% hydriodic acid are added. The reaction is left to continue until the starting material can no longer be detected by thin layer chromatographic analysis. This takes about 2 hours. The reaction mixture is poured into 1000 ml of water which is at a temperature of about 50°C. 2 g of active charcoal are added and the product is suction-filtered. Sufficient sodium dichromate is then added to the yellow filtrate at 40°C so that iodine starch paper indicates an excess of oxidising agent at the end of the reaction. 8.5 g of 5-nitro-naphthoquinone, melting point 163°C, are obtained by filtering off the precipitated reaction product.

EXAMPLE 20

5 g of 8-nitro-naphthoquinone oxime are suspended in 50 ml of chlorobenzene. 4 ml of 38% hydrochloric acid (38%), 2 ml of hydriodic acid, 4 ml of water and 0.1 g of disecondary butyl naphthalene sulphonate are added. The reaction mixture is heated to 45°C and sulphur dioxide is continuously introduced during the reaction. After completion of the reaction, the reaction mixture is suction-filtered and the filter residue is suspended in water and oxidised with 15 g of iron-III-chloride hexahydrate. 4.3 g of 5-nitro-naphthoquinone (melting point 161°C) are isolated.

EXAMPLE 21

50 g of 1,8-dinitro-naphthalene are treated with oleum by the method according to Friedländer, Volume 4, page 342. After completion of the reaction, the reaction mixture is poured into an amount of water calculated to produce approximately 42% by weight sulphric acid. Sulphur dioxide is then introduced at about 40°C, 4 g of sodium iodide are added and the reaction is completed in the course of about 3 hours at about 40°C, during which time sulphur dioxide continues to be passed through. When the excess sulphur dioxide has been expelled, the reaction mixture is diluted with 300 ml of water, and 25 g of $Na_2Cr_2O_7 \cdot 2H_2O$ in 40 ml of water are then added at 40°C. After 1 hour, the reaction mixture is suction-filtered and washed with water, sodium iodide solution and again with water. The moist filter cake is stirred up with 600 ml of toluene, the water is removed azeotropically on a water separator, and the insoluble constituents are filtered off at the boiling point 5 g of active charcoal. After evaporation down to about after the addition of about 80 ml and cooling, a 5-nitro-naphthoquinone-(1,4) with a melting point of 163°C is obtained in 89% yield, based on 8-nitro-naphthoquinone oxime.

EXAMPLE 22

6 g of iodine are added to a solution of 80 ml of acetone and 20 ml of water which is then saturated with sulphur dioxide at 40°C. 10.9 g of 8-nitro-naphthoquinone oxime are introduced. Hydrochloric acid gas is passed into the reaction mixture after 2 hours. The precipitated amine salt is filtered off and washed with solvent. The amine salt is suspended in 100 ml of water. 0.5 g of copper-(II)-chloride are added and the reaction mixture is oxidised with 12.5 g of 30% by weight hydrogen peroxide at about 20°C. 9.6 g of 5-nitro-naphthoquinone-(1,4), melting point 163°C, are obtained by filtration.

EXAMPLE 23

2 ml of hydriodic acid (57%) are added to a suspension of 10.9 g of 8-nitro-naphthoquinone oxime in 80 ml of methanol and 20 ml of concentrated hydrochloric acid with a concentration of 38 % per weight at 40°C while a weak stream of sulphur dioxide is passed through. The sulphur dioxide is continued to be passed through until a weight increase of 6.4 g is obtained. 100 ml of water are then added and the amino-naphthol is oxidised by introducing 30 g of iron-III-chloride hexahydrate. 9.4 g of 5-nitro-naphthoquinone-(1,4) are obtained by filtration.

EXAMPLE 24

43.6 g of a dinitronaphthalene mixture (containing approximately 82% of 1,8-dinitronaphthalene and approximately 16% of 1,5-dinitronaphthalene) are treated with oleum by a method analogous to that described in Friedlander, Volume 4, page 342. After termination of the reaction, the reaction mixture is poured into a quantity of water calculated to produce sulphuric acid of approximately 50% by weight. Sulphur dioxide is then introduced at 40°C, 3 ml of o-dichlorobenzene and 4 ml of hydriodic acid (at a concentration of 57% by weight) are added and the reaction is completed in 3–3.5 hours at 4°C while a further quantity of sulphur dioxide, amounting to 26 g, is passed through the reaction mixture. The reaction mixture and a solution of 13 g of sodium chlorate in 40 ml of water are poured at temperature of 40°C simultaneously into a solution of 1g of iron sulphate in 140 ml of water. After 1 hour the reaction mixture is suction-filtered and washed with water until the wash water is neutral. The moist filter cake is then dried in a vacuum at 60°C. 32 g of an approximately 78% by weight crude nitronaphthoquinone is obtained which corresponds to a yield of 62.5% of the theoretical, based on the sum of dinitronaphthalenes used.

What is claimed is:

1. Process for preparing 5-nitro-naphthoquinone-(1,4), which comprises reducing 8-nitro-naphthoquinone-(1,4)-oxime-(1) or 5-nitro-naphthoquinone-(1,4)-oxime-(1) or mixtures thereof in an acidic aqueous reaction medium or an acidic water-containing organic solvent reaction medium, said medium containing at least the stoichiometrically required amount of water at a temperature of from −10° to 110°C, by at least the equivalent quantity of sulfur dioxide or phosphorus or mixtures thereof in the presence of hydrogen iodide or compounds that form hydrogen iodide under the reaction conditions, and oxidizing the resulting 8- or 5-nitro-4-aminonaphthol-(1) or the corresponding salts to 5-nitro-naphthoquinone-(1,4) at a temperature of from −10° to 100°C, with or without first isolating the reduction product.

2. Process of claim 1 wherein the reduction is performed at a temperature of from 20° to 70°C.

3. Process of claim 1 wherein the oxidation is performed at a temperature of from 20° to 60°C.

4. Process of claim 1 wherein a salt of divalent or trivalent iron is used as a catalyst in the reduction process.

5. Process of claim 4 wherein the quantity of the iron salt used as the catalyst is from 0.05 to 3 mol per mol of oxime.

6. Process of claim 1 carried out in a reaction medium which has been acidified with sulfuric acid, without the intermediate isolation of the 8- or 5-nitro-4-aminonaphthol-(1) or mixtures thereof.

7. Process of claim 6 wherein the concentration of sulfuric acid is from 35 to 60% by weight.

8. Process of claim 1 wherein the reaction medium is aqueous sulfuric acid.

9. Process of claim 1 wherein the organic solvent in the organic reaction medium is a halogenated aromatic hydrocarbon.

10. Process of claim 9 wherein the halogenated aromatic hydrocarbon is dichlorobenzene.

11. Process of claim 1 wherein the halogenated aromatic hydrocarbon is chlorobenzene.

* * * * *